(12) United States Patent
Seol

(10) Patent No.: US 8,453,955 B2
(45) Date of Patent: Jun. 4, 2013

(54) MIXING MACHINE HAVING IMPROVED PULVERIZING EFFICIENCY

(75) Inventor: Yong-Seok Seol, Seoul (KR)

(73) Assignee: Daesung Artlon Co., Ltd., Seoul (KR)

( * ) Notice: Subject to any disclaimer, the term of this patent is extended or adjusted under 35 U.S.C. 154(b) by 357 days.

(21) Appl. No.: 13/025,554

(22) Filed: Feb. 11, 2011

(65) Prior Publication Data

US 2011/0198427 A1    Aug. 18, 2011

(51) Int. Cl.
*B02C 18/22*    (2006.01)

(52) U.S. Cl.
USPC .......................................... 241/74; 241/282.1

(58) Field of Classification Search
USPC ................. 241/224, 199.12, 282.1, 282.2, 74
See application file for complete search history.

(56) References Cited

U.S. PATENT DOCUMENTS

| | | | | |
|---|---|---|---|---|
| 2,278,125 A | * | 3/1942 | Landgraf | 241/282.2 |
| 2,873,923 A | * | 2/1959 | Bergman | 241/282.1 |
| 3,848,816 A | * | 11/1974 | Morley | 241/74 |
| 4,139,126 A | * | 2/1979 | Krasner et al. | 222/146.6 |
| 4,487,371 A | * | 12/1984 | Day | 241/48 |
| 4,688,478 A | * | 8/1987 | Williams | 99/503 |

FOREIGN PATENT DOCUMENTS

| | | |
|---|---|---|
| JP | 07-023848 | 1/1995 |
| JP | 2004-290057 | 10/2004 |
| KR | 20-0357368 | 7/2004 |
| KR | 20-2009-0011772 | 11/2009 |

* cited by examiner

*Primary Examiner* — Mark Rosenbaum
(74) *Attorney, Agent, or Firm* — Rabin & Berdo, P.C.

(57) ABSTRACT

Disclosed herein is a mixing machine having improved pulverizing efficiency. The mixing machine includes a main body having a motor therein, a container having a pulverizing blade therein, and a cover which covers the container and has an inlet hole. The mixing machine further includes an introducing unit which is coupled to the inlet hole of the cover, an inclined material-supply means which is provided in the introducing unit, and a discharge unit which is coupled to the container. The inclined material-supply means prevents material pulverized in the container from back flowing upwards. The discharge controls in multi-stages a rate at which pulverized product is discharged from the container. Therefore, a supply rate of material and the discharge rate of the pulverized product can be maintained constant so that the efficiency with which the material is pulverized is increased.

14 Claims, 12 Drawing Sheets

(a)

(b)

MIXING MACHINE HAVING IMPROVED PULVERIZING EFFICIENCY

BACKGROUND OF THE INVENTION

1. Field of the Invention

The present invention relates generally to mixing machines and, more particularly, to a mixing machine which can continuously supply material at a constant supply rate into a container using a material introducing unit removably coupled to a cover, and which can easily control a discharge rate of mixed and pulverized food using a discharge unit coupled to a predetermined portion of the container, whereby the operation of pulverizing food can be continuously conducted, and the pulverizing efficiency can be markedly enhanced.

2. Description of the Related Art

Generally, electric mixing machines are electric appliances in which blades are rotated by electric motors to mix or pulverize a variety of foods and drinks (hereinafter referred to as food). Such mixing machines can pulverize food, for example, mainly fruits, vegetables, etc., by rotating blades at high speed using rotational force of motors, thus producing juice, or can mix pulverized fruits with another type of food, thus creating food with a new taste. Furthermore, the mixing machines may be used to mince garlic, pepper or the like, thus avoiding the inconveniences of manually mincing these. Hereinafter, for the sake of explanation, the mincing, juicing, mixing, and so on of food using the blade of a mixing machine will be referred to as 'pulverizing'.

As shown in FIG. 1, a typical mixing machine includes a main body 1 in which a motor M is installed, a container 2 in which a pulverizing blade 3 is installed, and a cover 3 which is removably coupled to the container 2 to cover the container 2.

Furthermore, an inlet hole 41 which communicates with the interior of the container 2 is formed through a central portion of the cover 3. A discharge port 21 is provided on a lower portion of the sidewall of the container 2.

In this mixing machine, when the pulverizing operation is being conducted, material is continuously supplied into the container 2 through the inlet hole 41. The material supplied into the container 2 is pulverized by the pulverizing blade 3. Remnants remain inside the filter net 22, and pulverized food which has passed through the filter net 22 is discharged out of the mixing machine through the discharge port 21.

Typically, while mixing machines pulverize food, if the amount of material supplied into the container is relatively small or excessive, the efficiency of pulverizing may deteriorate. In particular, in the case of food, such as soaked grains, bean curd, etc., containing water or fibroid material, if an excessive amount of material is supplied into the container, it may not be pulverized to a satisfactory degree even after a predetermined passage of time. Thus, pieces of food which are not completely pulverized may be discharged through the discharge port.

Furthermore, in the conventional technique, the inlet hole 41 is defined by a vertical cylindrical pipe structure. Therefore, material is directly supplied into the container 2 through such inlet hole 41. This causes material to be excessively supplied into the container 2, thus further deteriorating the pulverizing efficiency. To avoid such problems, the user should check the interior of the container and control the amount of material input into the container through the inlet hole 41. However, this inconveniences the user. In addition, if the user cannot satisfy the pulverization conditions of the product discharged from the discharge port 21 after checking it himself/herself, the product may have to be pulverized again, thus inconveniencing the user.

As such, in the conventional mixing machine having the inlet hole 41 that enables the user to continuously supply material into the container, the inlet hole 41 causes material to be excessively supplied, resulting in deterioration of the pulverizing efficiency. The pulverization conditions of the product discharged from the discharge port 21 were also unsatisfactory.

Meanwhile, in the conventional mixing machine, when a stopper of the discharge port is open to discharge pulverized food while the pulverizing operation is being conducted in the container, a comparatively large piece of food which is not completely pulverized may be undesirably discharged out of the container, thus deteriorating the pulverizing efficiency.

In an effort to prevent a large piece of food which is not completely pulverized from being discharged from the discharge port, a technique in which a separate screen net is provided inside the discharge port of the container has been proposed. However, in this case where the discharge port is provided with the screen net, after a long period of time has passed, pieces of food get stuck to the screen net, thus impeding discharge of food, and forcing the user to periodically wash the screen net.

Furthermore, because opening or closing the stopper coupled to the discharge port is a manual operation, the rate at which food is discharged from the discharge port cannot be controlled. Thus, an excessive amount of food may be undesirably discharged, thus messing up the surroundings of the mixing machine.

In addition, in the conventional mixing machine, the discharge port is openably closed by the stopper. The stopper is manually open to discharge food, and is also manually closed to prevent impurities from entering the container when the mixing machine is not in use. However, it is very inconvenient to open or close the stopper, and every time the stopper is manually manipulated to open or close the discharge port through which food is discharged, impurities or bacilli which have been on the hands of the user may enter the discharge port or food, and thus is unsanitary.

Because of such reasons, despite the intended purpose of the discharge port which is to enhance the operation efficiency in such a way as to discharge pulverized food while food is being pulverized, the user typically does not open the stopper until the operation of pulverizing food input into the container has completely finished.

SUMMARY OF THE INVENTION

Accordingly, the present invention has been made keeping in mind the above problems occurring in the prior art, and an object of the present invention is to provide a mixing machine which is configured such that food can be continuously input into a container and pulverized food can be discharged out of the container while food is being pulverized in the container.

Another object of the present invention is to provide a mixing machine which can maintain the amount of food which is being pulverized in the container constant, so that the food can be rapidly and evenly pulverized.

A further object of the present invention is to provide a mixing machine having improved pulverizing efficiency which can maintain the rate, at which material is input from an introducing unit coupled to a cover into the container, constant without forcing a user to pay close attention to the amount of material input into the introducing unit.

Yet another object of the present invention is to provide a mixing machine having improved pulverizing efficiency which can prevent material which is being pulverized in the container from springing upwards out of the introducing unit provided on the cover.

Yet another object of the present invention is to provide a mixing machine having improved pulverizing efficiency which can finely control a rate at which pulverized food is discharged out of a discharge unit so that only evenly pulverized food can be discharged to the outside.

Yet another object of the present invention is to provide a mixing machine which can maintain a supply rate of material and a discharge rate of pulverized food at an optimum level even though the desired size of the particles of the pulverized food changes depending on the kind of material and the purpose of use, for example, for mincing food, or mixing several kinds of foods, producing liquefied juice, etc., so that a mixing or pulverization rate (density) of food which is pulverized in the container can be maintained appropriate, thus producing evenly pulverized food more rapidly.

Yet another object of the present invention is to provide a mixing machine which includes the introducing unit which can prevent food which has been input into the container from moving backwards out of the introducing unit, and a discharge unit which can finely control the discharge rate of pulverized food, so that the surroundings of the mixing machine can be always maintained clean, and the mixing machine can be sanitarily used.

In order to accomplish the above object, the present invention provides a mixing machine, including: a main body having a motor therein; a container having a pulverizing blade therein; a cover for covering the container, with an inlet hole formed through the cover; an introducing unit coupled to the inlet hole of the cover; an inclined material-supply means provided in the introducing unit so that material is supplied into the container via the inclined material-supply means, the inclined material-supply means for preventing material pulverized in the container from back flowing upwards; and a discharge unit coupled to the container, the discharge unit controlling in multi-stages a rate at which a pulverized product is discharged from the container, whereby a rate at which material is supplied into the container and the rate at which the pulverized product is discharged from the container are maintained constant so that an efficiency with which the material is pulverized is increased.

The introducing unit may include: a pipe inserted into the inlet hole of the cover, the pipe being located inside the container; and a hopper located outside the cover so that the material is put into the hopper.

The introducing unit may further include a vibration activation means for activating vibrations transmitted from the motor to the introducing unit while pulverizing the material.

The vibration activation means may include: an annular stop protrusion provided around an outer surface of the introducing unit, the annular stop protrusion being coupled to a circumferential edge of the inlet hole of the cover; and a plurality of balls located in the annular stop protrusion, the balls being supported on an upper surface of the circumferential edge of the inlet hole.

The inclined material-supply means may include a plurality of inclined plates provided on an inner surface of the pipe at different heights, the inclined plates forming a symmetric structure along a center line of the pipe, wherein when viewed in a longitudinal direction of the pipe, a surface area of each of the inclined plates is greater than an area of at least a half of a circle defined by the pipe, so that the material falls from the hopper into the container in a zigzag form.

Alternatively, the inclined material-supply means may include a spiral inclined plate having a size appropriate to prevent an interior of the container from being exposed to an outside when viewed in a longitudinal direction of the pipe.

As a further alternative, the inclined material-supply means may include: a rotating shaft coupled to an inner surface of the pipe in a direction traversing a central axis of the pipe; and a rotating plate having a diameter corresponding to an inner diameter of the pipe, wherein the rotating plate is tilted to one of opposite sides around the rotating shaft by a weight of the material placed onto the rotating plate so that the material is supplied from the hopper into the container.

The discharge unit may include: a flange provided on a lower portion of a sidewall of the container, the flange forming an outlet port; a housing having a coupling part on one end thereof, the coupling part being coupled to the flange, with a discharge port formed in a lower portion of the housing; an operating shaft provided in the housing, with a lever coupled to a first end of the operating shaft, and a stopper provided on a second end of the operating shaft, wherein depending on operation of the lever, the stopper is brought into close contact with the outlet port to close a flow passage or is moved away from the outlet port to open the flow passage; an elastic member biasing the operating shaft from the housing towards the outlet port; and a flow rate control means for locking a position of the operating shaft in multi-stages so as to control a distance between the stopper and the outlet port.

The flow rate control means may include: a plurality of seating protrusions provided on a circumferential outer surface of the operating shaft at positions spaced apart from each other at regular intervals; and a seating depression formed in a circumferential inner surface of the housing so that a selected one of the seating protrusions is seated into the seating depression.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
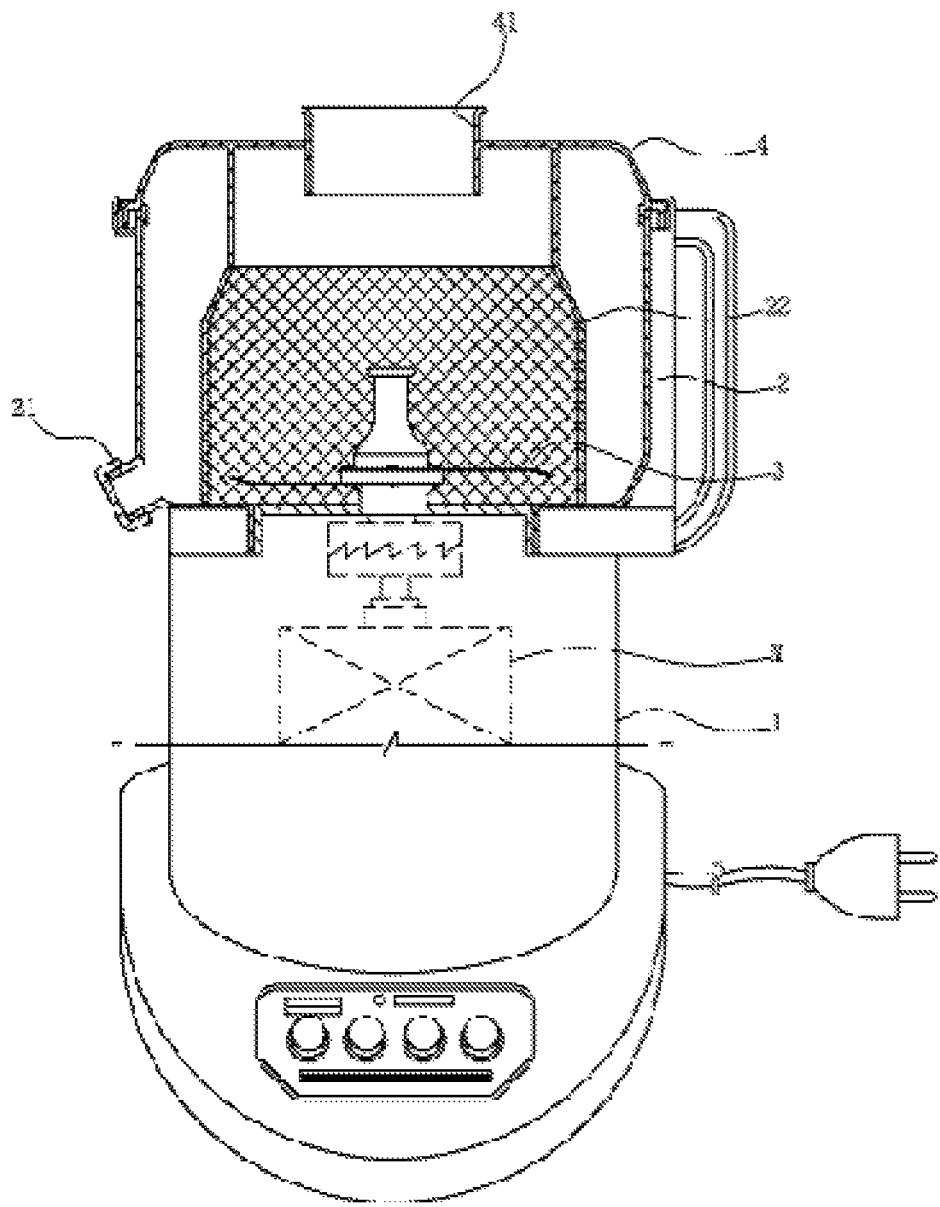
FIG. 1 is a view showing the construction of an example of a conventional mixing machine.
Figure 2:
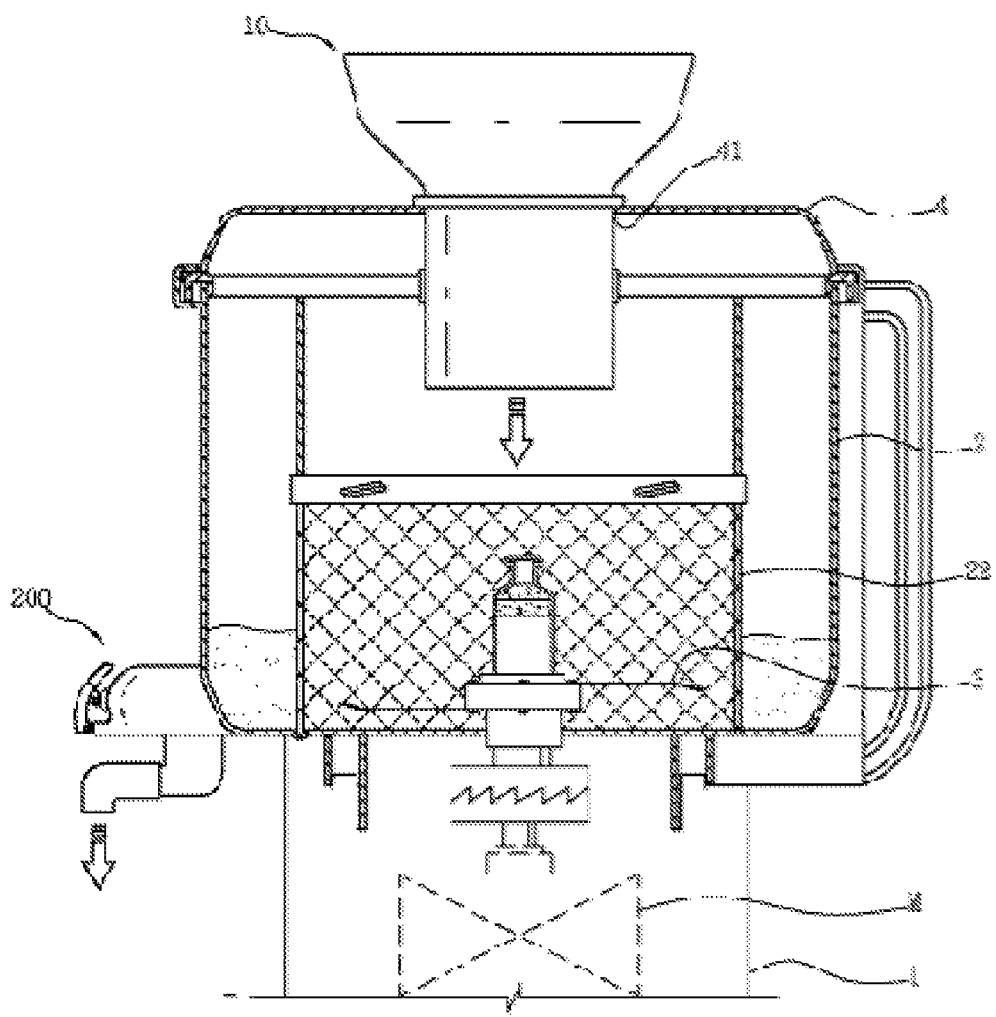
FIG. 2 is a view showing the construction of a mixing machine, according to the present invention.

FIG. 2 is a view showing a mixing machine according to the present invention. The present invention provides the mixing machine which is configured such that the rate at which material is input into a container 2 in which a pulverizing blade 3 is located, and a rate at which pulverized product is discharged from the container 2 are maintained constant to meet the optimum pulverizing efficiency according to the kind of food to be treated.

To achieve the above purpose, the mixing machine according to the present invention includes a main body 1 with a motor M, a container 2 with the pulverizing blade 3, and a cover 4 which covers the container 2. The mixing machine further includes an introducing unit 10 which is removably coupled to an inlet hole 41 formed through the cover 4 so that material can be continuously input into the container 2 through the introducing unit 10 while the pulverizing operation is being carried out, and a discharge unit 200 which is coupled to a predetermined portion of the container 2 so that pulverized food is discharged out of the container 2 through the discharge unit 200.

Figure 3:
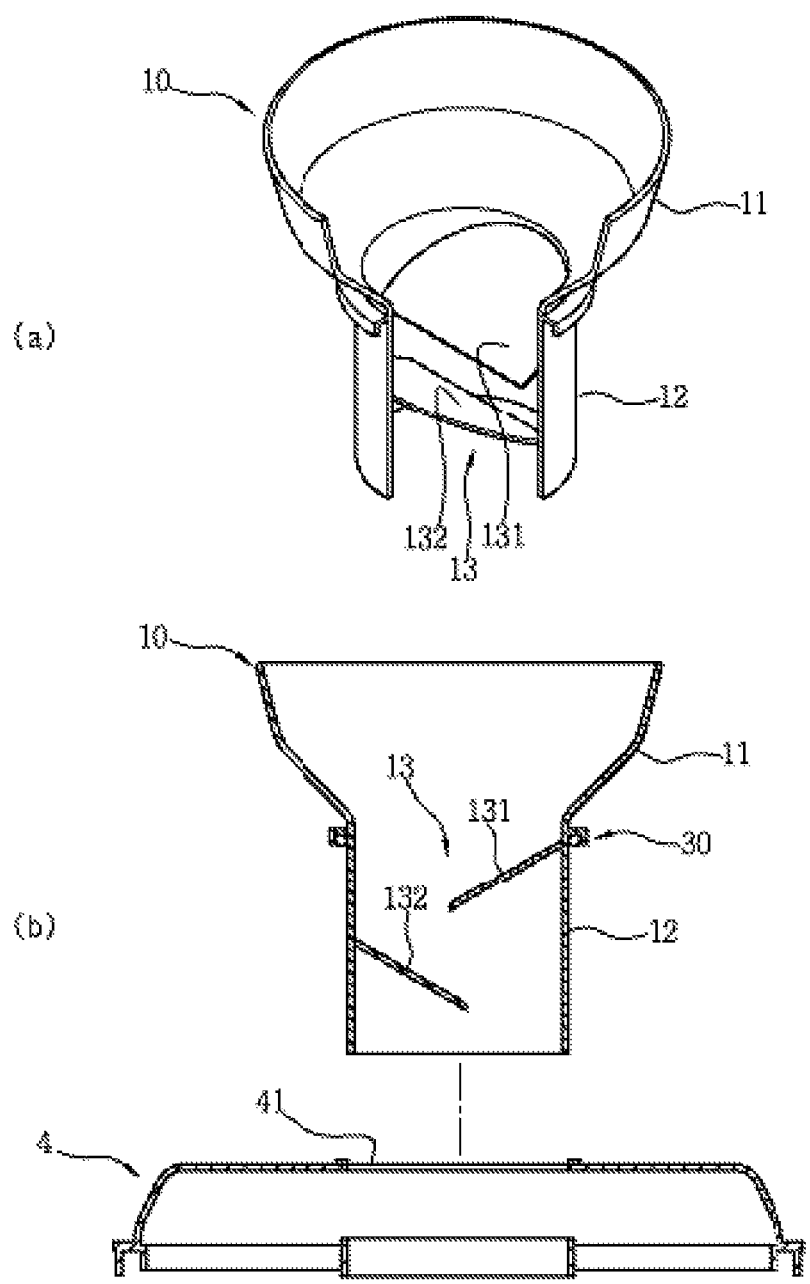
FIGS. 3A and 3B are, respectively, a partially broken perspective view and a sectional view of an introducing unit according to a first embodiment of the present invention.
Figure 4:
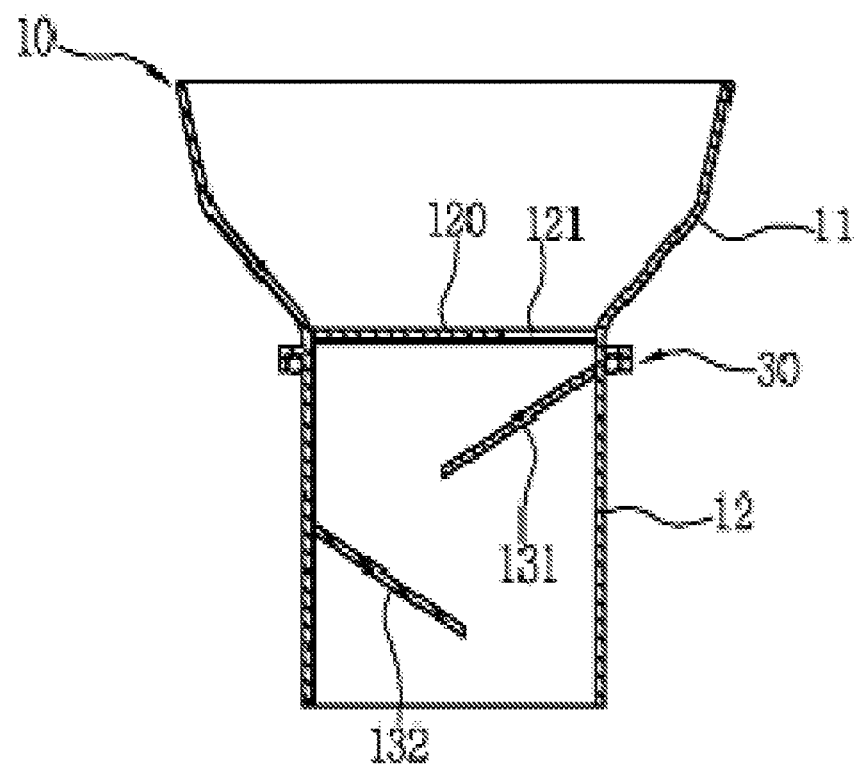
FIG. 4 is a sectional view showing a modification of the introducing unit of FIG. 3.
Figure 5:
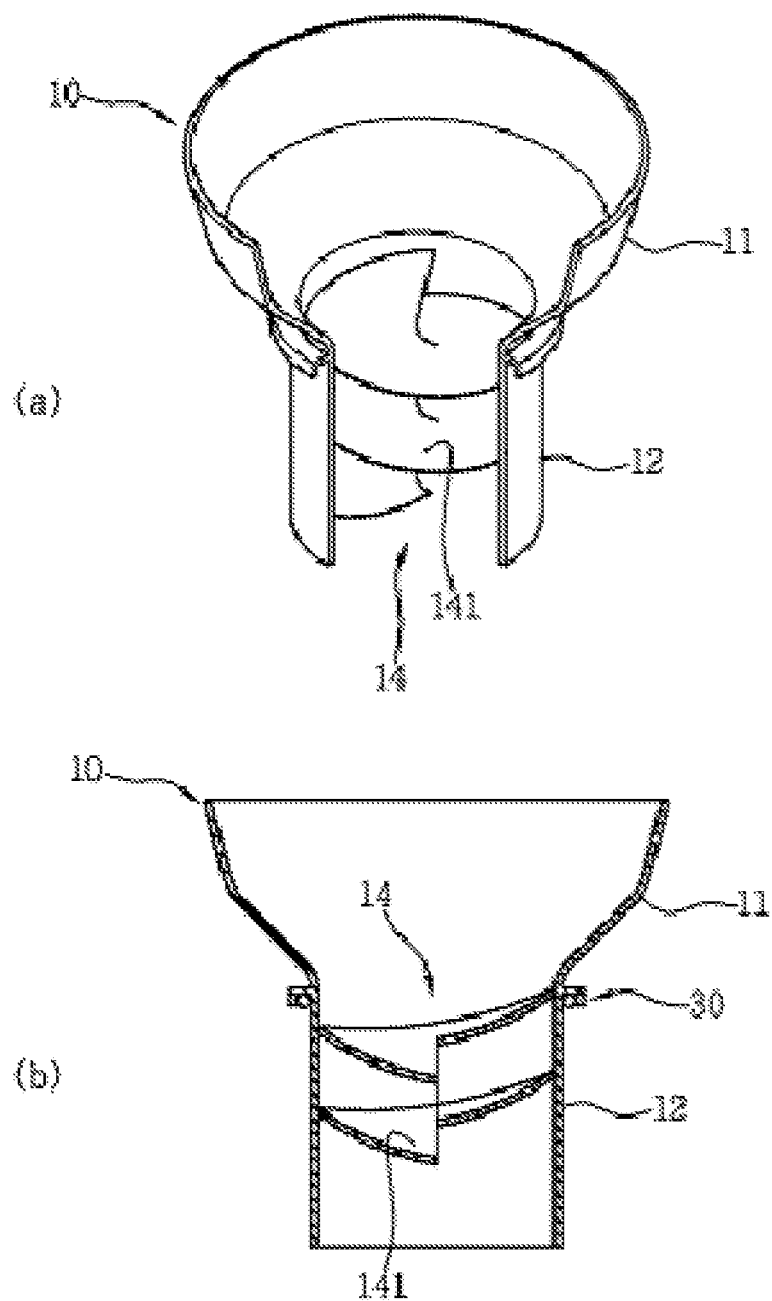
FIGS. 5A and 5B are, respectively, a partially broken perspective view and a sectional view of an introducing unit according to a second embodiment of the present invention.
Figure 6:
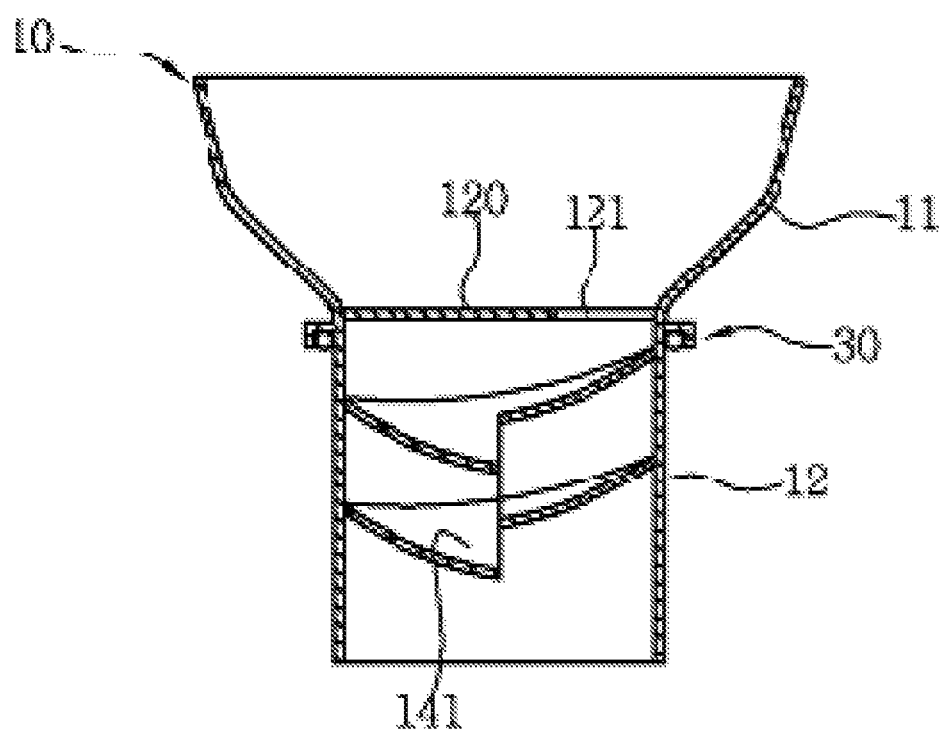
FIG. 6 is a sectional view showing a modification of the introducing unit of FIG. 5.
Figure 7:
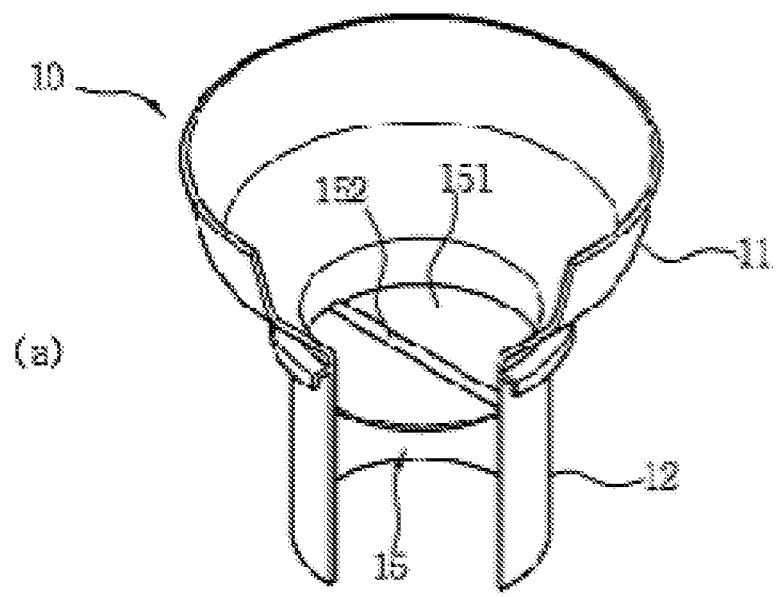
FIGS. 7A and 7B are, respectively, a partially broken perspective view and a sectional view of an introducing unit according to a third embodiment of the present invention.
Figure 7:
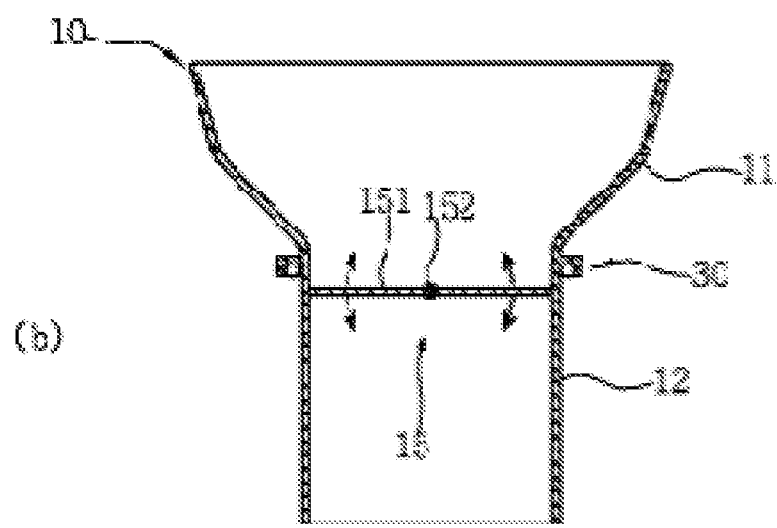
Figure 8:
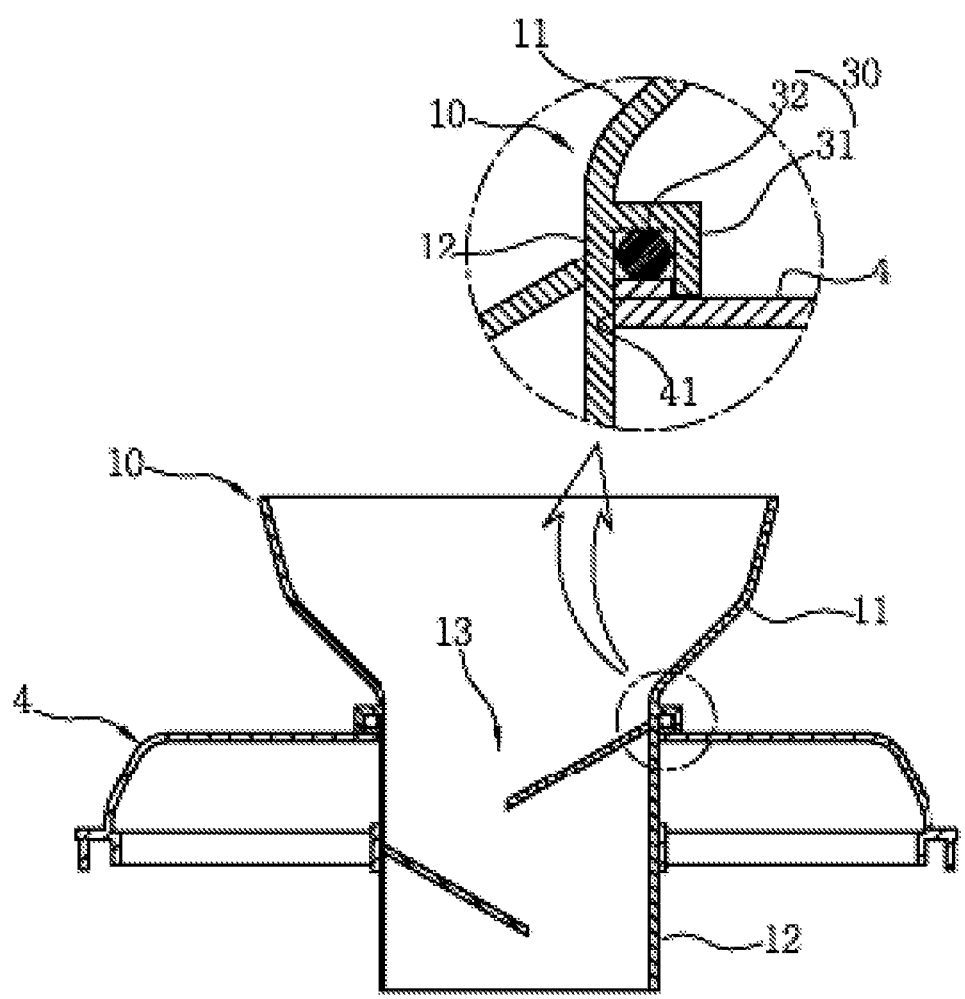
FIG. 8 is of a sectional view and a partial enlarged view showing a vibration activation means provided in the introducing unit according to the present invention.

FIGS. 3A, 3B and 4 illustrate a first embodiment of the introducing unit 10 according to the present invention. FIGS. 5 and 6 illustrate a second embodiment of the introducing unit 10 according to the present invention. FIG. 7 illustrates a third embodiment of the introducing unit 10 according to the present invention. FIG. 8 illustrates the construction of a vibration activation means provided in the introducing unit 10 according to the present invention. First, the introducing unit 10 of the present invention will be described in detail with reference to FIG. 2.

The introducing unit 10 of the present invention has a removable structure such that it is removably inserted into the inlet hole 41 formed through the cover 4 of the mixing machine.

The introducing unit 10 integrally includes a pipe 12 which is inserted into the inlet hole 41 of the cover 4 of the mixing machine and is located inside the container 2, and a hopper 11 which is located outside the cover 4 to receive material.

The pipe 12 of the introducing unit 10 includes, on the inner surface thereof, an inclined material-supply means 13, 14, 15 which supplies material which has been in the hopper 11 into the container 2 downwards at a constant supply rate, and which prevents material which is being pulverized in the container 2 from moving backwards, that is, upwards, through the pipe 12.

Furthermore, the introducing unit 10 further includes a vibration activation means 30 which activates vibration transmitted from the motor M to the introducing unit 10 while the mixing machine pulverizes input material.

The introducing unit 10 including the inclined material-supply means 13, 14, 15 is provided to embody the mixing machine in which material can be continuously supplied into the container 2 covered with the cover 4 at a constant supply rate even when the pulverizing operation is being conducted and pulverized food is being discharged out of the container 2 through the discharge unit 200. Thanks to such an introducing unit 10, the present invention does not force a user to pay close attention to the amount of material being input into the introducing unit 10. In other words, material can always be input into the container 2 at a constant supply rate without excessiveness or insufficiency regardless of the amount of material put into the hopper 11 of the introducing unit 10, for example, even if the user puts a large amount of material into the hopper 11. Therefore, the pulverizing efficiency of the mixing machine can be enhanced. Furthermore, the introducing unit 10 including the inclined material-supply means 13, 14, 15 functions to prevent food which is being pulverized in the container 2 from moving backwards through the introducing unit 10.

In detail, referring to FIGS. 3 and 4, the introducing unit 10 according to the first embodiment includes a pipe 12 which is inserted into the inlet hole 41 formed through the cover 4 and is located inside the container 2, and a hopper 11 which is located outside the cover 4 so that material is put into the hopper 11. Furthermore, an inclined material-supply means 13 is provided in the pipe 12. The inclined material-supply means 13 includes a plurality of inclined plates 131 and 132 which form a symmetric structure along the center line of the pipe 12 and are provided on the inner surface of the pipe 12 at different heights. In addition, when viewed in the longitudinal direction of the pipe 12, the surface area of each inclined plate 131, 132 is greater than that of at least a half of a circle defined by the pipe 12, so that material falls from the hopper 11 into the container 2 in a zigzag form through the pipe 12.

As such, due to the inclined material-supply means 13 including the inclined plates 131 and 132, even though the user puts desired material into the hopper 11 without checking the amount of food pulverized in the container 2 with the eyes, the material put into the hopper 11 moves downwards into the container 2 in a zigzag manner along the upper surfaces of the inclined plates 131 and 132 installed with a predetermined height difference, because of vibrations generated by the operation of the motor M of the mixing machine which is conducting the pulverizing operation. Therefore, the inclined material-supply means 13 can realize the structure such that even if a large amount of material is put into the hopper 11, the material which has been in the hopper 11 is supplied into the container 2 at a constant supply rate in such a way as to move downwards along the inclined plates 131 and 132 rather than directly falling into the container 2 at a time.

Although two inclined plates 131 and 132 have been illustrated as being provided in this embodiment, the number of inclined plates may be increased depending on the length of the pipe 12.

Furthermore, the inclined material-supply means 13 is designed such that when viewed in the longitudinal direction of the pipe 12, the surface area of each inclined plate 131 and 132 is greater than that of a half of the circle defined by the pipe 12. Thus, when viewed from the hopper 11 to the pipe 12, the interior of the container 2 is covered with the inclined plates 131 and 132 without being exposed to the outside. Hence, material which is being pulverized in the container 2 is prevented from springing out of the hopper 11 through the introducing unit 10, so that the surroundings of the introducing unit 10 can be kept clean.

Preferably, as shown in FIG. 4, an input plate 120 which has an opening 121 at a position away from the center is provided on the junction between the hopper 11 and the pipe 12 so that material can first fall onto the upper surface of the uppermost inclined plate 131.

Referring to FIGS. 5A, 5B and 6, the introducing unit 10 according to the second embodiment includes a pipe 12 which is inserted into the inlet hole 41 formed through the cover 4 and is located inside the container 2, and a hopper 11 which is located outside the cover 4 so that material is put into the hopper 11, wherein an inclined material-supply means 14 including a spiral inclined plate 141 is provided in the pipe 12.

In this embodiment having the inclined material-supply means 14 comprising the spiral inclined plate 141, even though only the user puts desired material into the hopper 11, the material put into the hopper 11 can be moved downwards and supplied into the container 2 along the upper surfaces of the spiral inclined plate 141 by vibrations generated by the operation of the motor M of the mixing machine which is conducting the pulverizing operation. Therefore, the inclined material-supply means 14 can realize the structure such that even if a large amount of material is put into the hopper 11, the material which has been in the hopper 11 is supplied into the container 2 at a constant supply rate in such a way as to move downwards along the spiral inclined plate 141 rather than directly falling into the container 2 all at a single time. Unlike shown in the drawing, the number of times with which the spiral inclined plate 141 is spiraled may be varied depending on the length of the pipe 12.

In the same manner as the first embodiment, the inclined material-supply means 14 is designed such that when viewed from the hopper 11 to the pipe 12, the interior of the container 2 is covered with the spiral inclined plate 141 without being exposed to the outside (it can be embodied by corresponding the size (width) of the spiral inclined plate equal to the radius of the pipe 12). Hence, material which is being pulverized in the container 2 is prevented from springing out of the hopper 11 through the introducing unit 10.

Furthermore, as shown in FIG. 6, it is desirable that an input plate 120 which has an opening 121 at a position away from the center be provided on the junction between the hopper 11 and the pipe 12 so that material can first fall onto the uppermost surface of the spiral inclined plate 141.

Referring to FIGS. 7A and 7B, the introducing unit 10 according to the third embodiment includes a pipe 12 which is inserted into the inlet hole 41 formed through the cover 4 and is located inside the container 2, and a hopper 11 which is located outside the cover 4 so that material is put into the hopper 11, wherein an inclined material-supply means 15 is provided in the pipe 12. The inclined material-supply means 15 includes a rotating shaft 152 which is provided on the inner surface of the pipe 12 and traverses the central axis of the pipe 12, and a rotating plate 151 which has a diameter corresponding to the inner diameter of the pipe 12.

In this embodiment provided with the inclined material-supply means 15 including the rotating plate 151, even though only the user puts desired material into the hopper 11, the rotating plate 151 is tilted to one side around the rotating shaft 152 depending on a weight difference between materials on two sides of the rotating plate 151, the weight difference being varied by vibrations generated by the operation of the motor M of the mixing machine, and thereafter the material moves downwards along the tilted rotating plate 151 and then is supplied into the container 2. Therefore, the inclined material-supply means 15 can realize the structure such that even if a large amount of material is put into the hopper 11, the material which has been in the hopper 11 is supplied into the container 2 at a constant supply rate in such a way as to move downwards along the tilted rotating plate 151 rather than directly falling into the container 2 all at a single time.

Furthermore, the inclined material-supply means 15 is designed such that when material is not supplied into the container 2, the interior of the container 2 is covered with the rotating plate 151 without being exposed to the outside. Hence, material which is being pulverized in the container 2 is prevented from springing out of the hopper 11 through the introducing unit 10.

As illustrated in the several embodiments of the present invention, the inclined material-supply means 13, 14, 15 continuously supplies material from the hopper 11 into the container 2 at a constant supply rate using vibration generated by the operation of the motor of the mixing machine, rather than forcing the user to directly supply material into the container 2. Here if the intensity of vibrations of the mixing machine itself is not sufficient, the effect of the inclined material-supply means 13, 14, 15 may be unsatisfactory. In an effort to overcome this fact, the introducing unit 10 according to the present invention includes the vibration activation means 30 which further activates vibrations transmitted from the motor of the mixing machine to the introducing unit 10.

In detail, as shown in FIG. 8, the vibration activation means 30 according to the present invention includes an annular stop protrusion 31 which is provided around the outer surface of the introducing unit 10 and connected to the circumferential edge of the inlet hole 41 formed in the cover 4, and a plurality of balls 32 which are located in the annular stop protrusion 31 and supported on the upper surface of the circumferential edge of the inlet hole 41 when the pipe 12 is inserted into the inlet hole 41.

The balls 32 are freely movable in the annular stop protrusion 31. Vibrations generated by the operation of the motor of the mixing machine is transmitted to the balls 32 via the cover 4. Such balls 32 which freely vibrate in the annular stop protrusion 31 further activate the vibrations of the introducing unit 10. By virtue of the vibrations of the introducing unit 10 which is activated by the balls 32, material which has been in the hopper 11 falls onto the inclined material-supply means 13, 14, 15 and smoothly moves downwards along the inclined plates 131 and 132, the spiral inclined plate 141 or the rotating plate 151 before it is supplied into the container 2.

Figure 9:
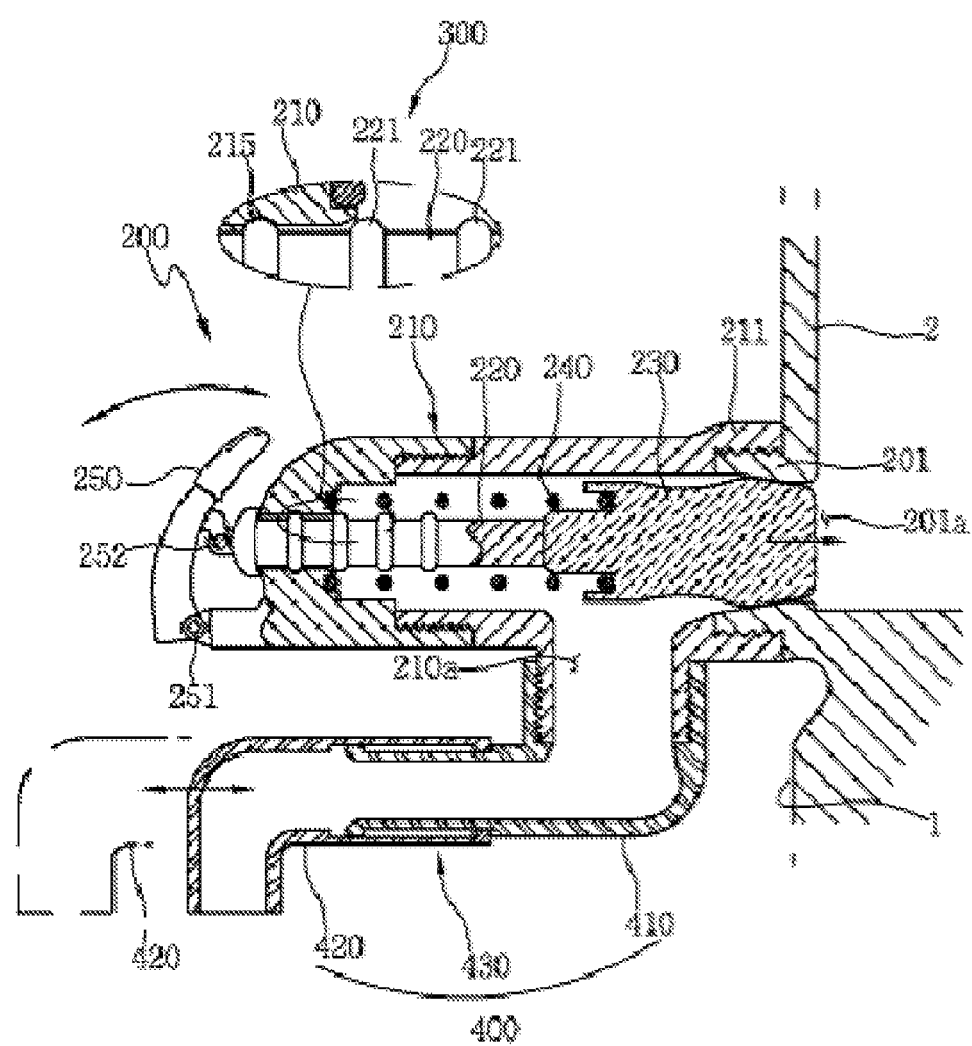
FIG. 9 is a sectional view showing a closed state of a discharge unit according to the present invention.
Figure 10:
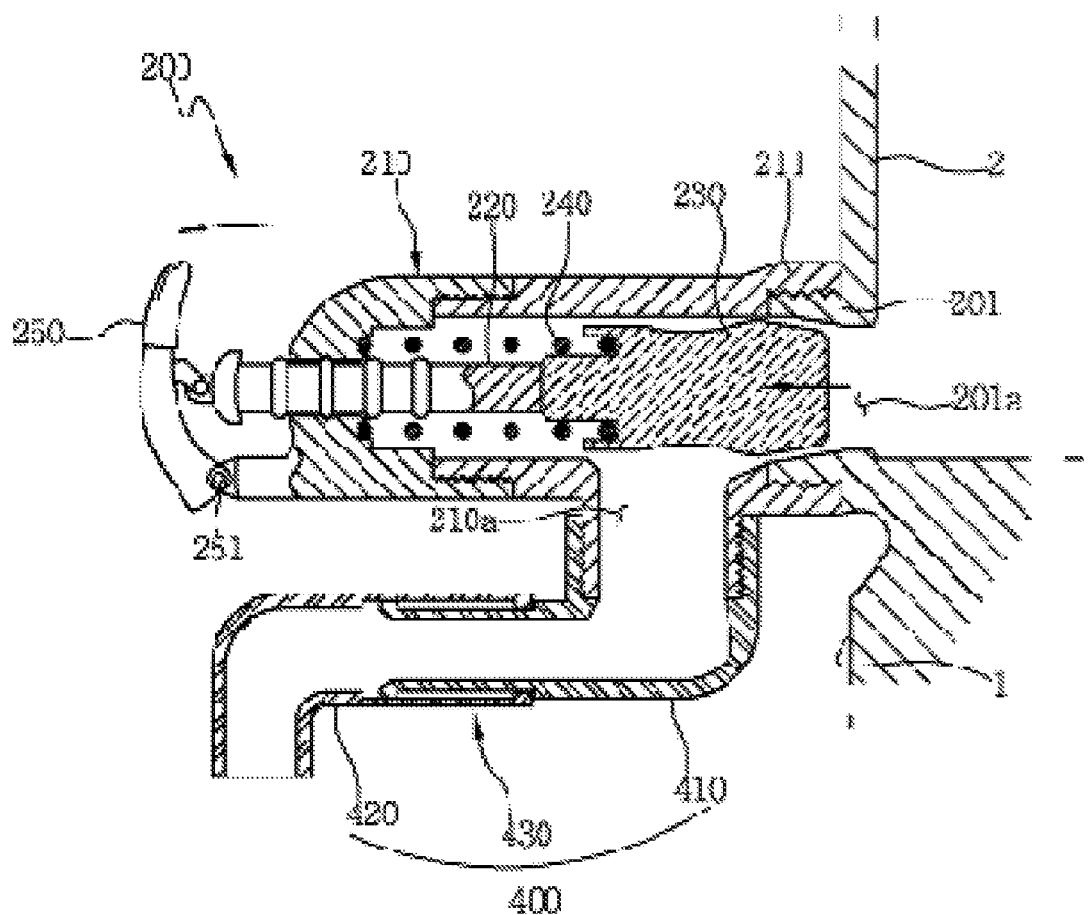
FIGS. 10 and 11 are sectional views showing a multi-stage open state of the discharge unit according to the present invention.
Figure 11:
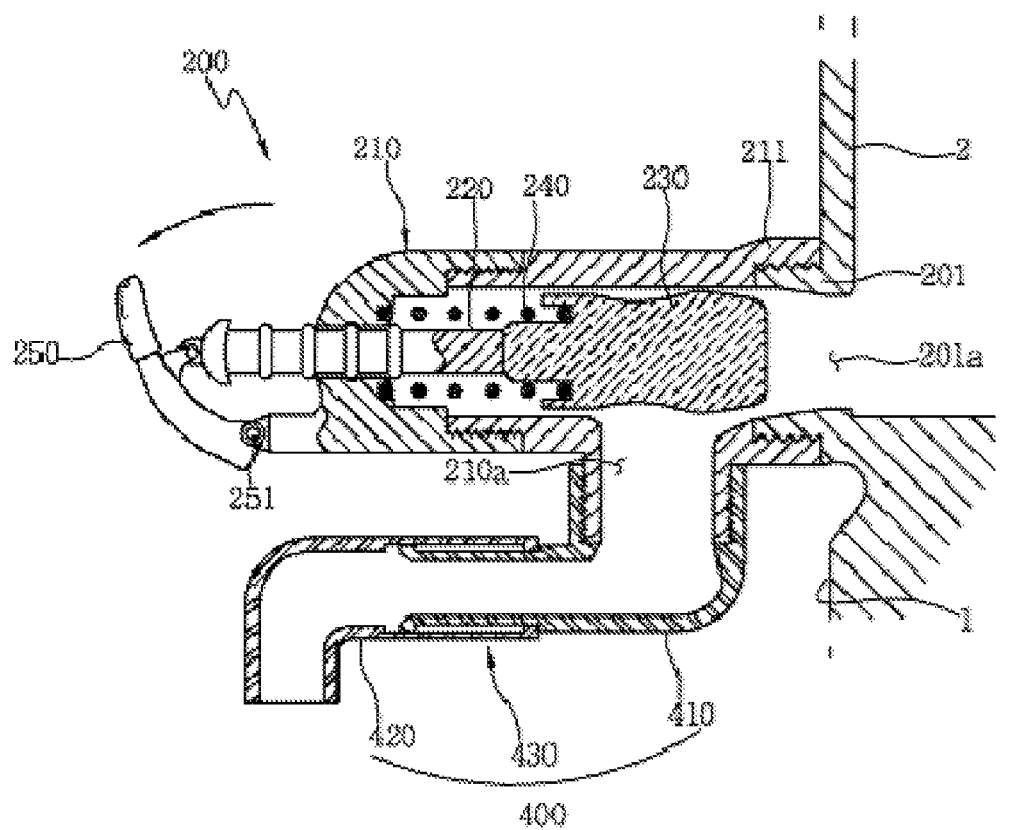
Figure 12:
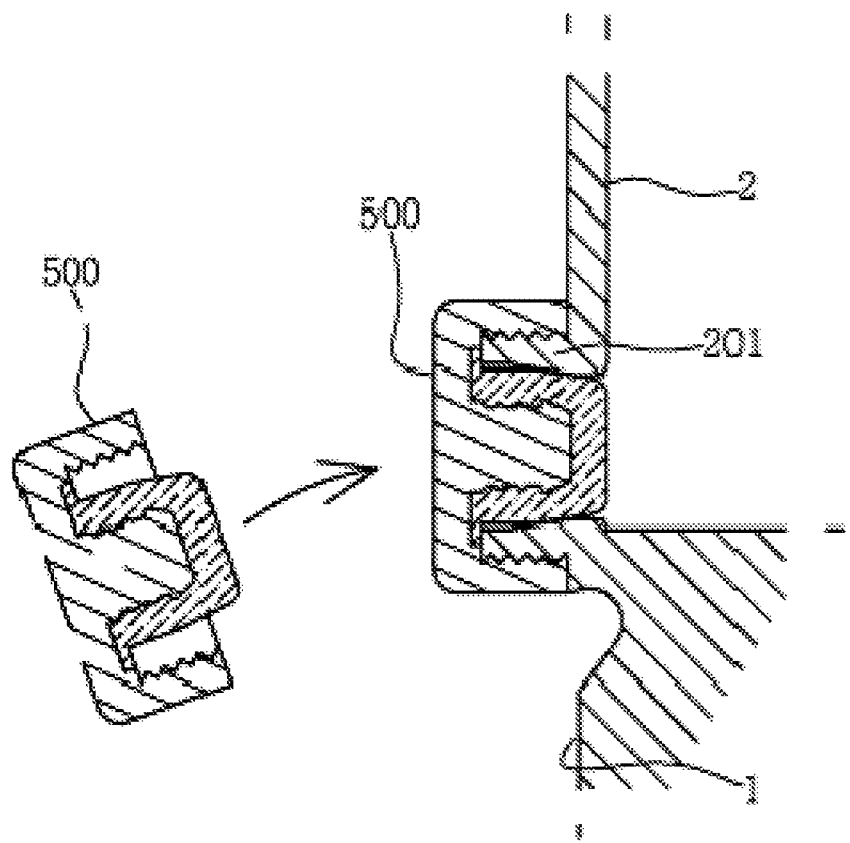
FIG. 12 is a sectional view showing a sealing stopper coupled to the mixing machine when the discharge unit is not in use according to the present invention.

Meanwhile, FIG. 9 illustrates a closed state of the discharge unit 200 according to the present invention. FIG. 10 illustrates a first-stage open state of the discharge unit 200. FIG. 11 illustrates a second-stage open state of the discharge unit 200. FIG. 12 illustrates a sealing stopper 500 coupled to the container 2 when the discharge unit 200 is not in use. The discharge unit 200 of the present invention will be described in detail with reference to these drawings along with FIG. 2.

The discharge unit 200 of the present invention includes a flange 201, a housing 210, an operating shaft 220, an elastic member 14 and a flow rate control means 300. The flange 201 is provided on a lower portion of the sidewall of the container 2 and forms an outlet port 201a. The housing 210 has a coupling part 211 which is coupled to the flange 201. A discharge port 210a is formed in a lower portion of the housing 210. The operating shaft 220 is provided in the housing 210. A lever 250 is coupled to a first end of the operating shaft 220 and a stopper 230 is provided on a second end of the operating shaft 220 so that depending on the operation of the lever 250, the stopper 230 is brought into close contact with the outlet port 201a to close a flow passage or is moved away from the outlet port 201a to open the flow passage. The elastic member 14 biases the operating shaft 220 from the housing 210 towards the outlet port 201a. The flow rate control means 300 locks the position of the operating shaft 220 in multi-stages so as to control the distance between the stopper 230 and the outlet port 201a.

The flow rate control means 300 includes a plurality of seating protrusions 221 which are provided on the circumferential outer surface of the operating shaft 220 at positions spaced apart from each other at regular intervals, and a seating depression 215 which is formed in the circumferential inner surface of the housing 210 so that a selected one of the seating protrusions 221 is seated into the seating depression 215. Such flow rate control means 300 controls the degree of opening of the flow passage in multi-stages as many as the number of seating protrusions 221 which are arranged on the operating shaft 220 along the longitudinal direction. In the present invention, the number of seating protrusions 221 is not limited to a special range.

In detail, the flange 201 may be integrally formed on the container 2. An external thread is formed on the circumferential outer surface of the flange 201 so that the coupling part 211 of the housing 210 is threaded over the flange 201.

The housing 210 has, on one end thereof, the coupling part 211 which is threaded over the flange 201, so that the housing 210 can be separably coupled to the flange 201.

The operating shaft 220 is provided through the housing 210 in the horizontal direction. The first end of the operating shaft 220 that protrudes outwards from the housing 210 is coupled by a hinge 252 to a medial portion of the lever 250 which is coupled at one end thereof to the housing 210 by a hinge 251. Thus, when the lever 250 is rotated around the hinge 251, the operating shaft 220 which is coupled to the medial portion of the lever 250 by the hinge 252 moves in the horizontal direction to move the stopper 230 towards or away from the outlet port 201a, thus opening or closing the flow passage defined from the outlet port 201a to the discharge port 210a.

When the flow passage is in the closed state, because the operating shaft 220 is biased towards the outlet port 201a by the elastic member 240, the stopper 230 can reliably maintain the state of coming into tight contact with the outlet port 201a to interrupt the flow passage. From this state, when it is desired to open the discharge unit 200, the lever 250 is pulled so that the operating shaft 220 is moved away from the outlet port 201a while overcoming the elastic force of the elastic member 240. A selected one of the seating protrusions 221 provided on the operating shaft 220 is inserted into the seating depression 215 formed in the housing 210. Thereby, the discharge unit 200 can be kept in the open state.

As shown in FIGS. 10 and 11, depending on the degree to which the user pulls the lever 250 which is operated in multi-stages, there being as many multi-stages as there are seating protrusions 221, the degree of opening of the flow passage can be controlled in multi-stages.

To close the discharge unit 200 again, as shown in FIG. 9, the user lightly pushes the lever 250 such that the seating protrusion 221 of the operating shaft 220 is removed from the seating depression 215 of the housing 210. Then, the operating shaft 220 is moved by the elastic force of the elastic member 240 towards the outlet port 201a, so that the stopper 230 provided on the second end of the operating shaft 220 is tightly fitted into the outlet port 201a, thus interrupting the flow passage.

Meanwhile, a separate extension pipe 400 may be connected to the discharge port 210a formed in the lower portion of the housing 210.

The extension pipe 400 may comprise a first extension pipe 410 which is connected to the discharge port 210a of the housing 210 and is bent at a predetermined position thereof, and a second extension pipe 420 which is connected to an end of the first extension pipe 410 by a length adjustment means provided on the junction therebetween. As shown in the drawings, the length adjustment means can be embodied by forming a slidable-insert structure between the first extension pipe 410 and the second extension pipe 420.

The operation of the mixing machine including the discharge unit 200 and the introducing unit 10 provided with the inclined material-supply means 13, 14, 15 will be explained below.

First, initial food is input into the container 2 of the mixing machine, and the container 2 is covered with the cover 4. Thereafter, the operation of pulverizing the food is conducted. Because of centrifugal force generated by the rotation of the pulverizing blade 3, food pulverized into small particles flows around along the circumferential inner surface of a filter net 22 provided in the container 2. Particles of food which are smaller than the mesh of the filter net 22 pass through the filter net 22 and then are discharged out of the mixing machine via the discharge unit 200 coupled to the mixing machine.

While the mixing machine is being operated in such a manner, the user inputs material into the introducing unit 10 mounted to the cover 4 so that the material is continuously supplied into the container 2. Food which has been pulverized is discharged out of the mixing machine through the discharge unit 200. Therefore, pulverized food can be continuously produced.

Here, after a predetermined time has passed after beginning the operation of pulverizing the initial food, the user rotates (pulls) the lever 250 of the discharge unit 200 in the direction away from the discharge unit 200 so that the operating shaft 220 moves rearwards (in the direction away from the outlet port 201a) while overcoming the elastic force of the elastic member 240. When the operating shaft 220 has moved rearwards a predetermined distance, a selected one of the seating protrusions 221 provided on the operating shaft 220 is locked into the seating depression 215 formed in the housing 210, so that the operating shaft 220 is maintained stationary at the selected position. As such, when the operating shaft 220 moves rearwards, the stopper 230 which has been tightly fitted in the outlet port 201a is removed from the outlet port 201a. Thereby, the outlet port 201a communicates with the discharge port 210a, so that food which has been pulverized in the container 2 is discharged out of the mixing machine via the discharge port 210a and the extension pipe 400.

For example, if it is determined that the sizes of particles of the discharged food are not as thin as desired, the user rotates (pushes) the lever 250 in the reverse direction, that is, towards the discharge unit 200, so as to close the flow passage so that food in the container 2 can be pulverized into even thinner particles. Alternatively, the user may manipulate the lever 250 such that the flow passage is slightly open so that only comparatively thin particles can be discharged out of the mixing machine.

Furthermore, when the mixing machine pulverizes fruits, vegetables, bean curd, beans containing water, etc. to obtain juice, paste or slurry type food, the viscosity of crushed food (the degree with which the density of the crushed food is thick) can be maintained constant so that the optimum pulverizing efficiency pertaining to the rotation of the pulverizing blade 3 can be realized (typically when the viscosity of food in the container is comparatively low, the pulverizing efficiency is reduced, whereas when the viscosity of food is high, the pulverizing efficiency is increased).

For example, at the initial stage of the pulverizing operation, the flow passage of the discharge unit 200 is closed or is slightly open and material is continuously supplied into the container through the introducing unit 10 so that the viscosity of food which is being pulverized in the container can be maintained at a comparatively high level. When food which is being pulverized dilutes to a predetermined degree after a predetermined time has passed, the flow passage of the discharge unit 200 slowly opens wider so that food which has been sufficiently pulverized can be rapidly discharged. Continuously, new food is supplied into the container 2 through the introducing unit 10 so that the viscosity of food which is being pulverized in the container 2 is increased again by the newly supplied food and then maintained comparatively high. Thereby, the pulverizing efficiency of the pulverizing blade 3 can be maintained optimal.

As such, the present invention can provide the enhanced effect when pulverizing food containing water or fibrous material, for example, soaked grains, beans containing water, bean curd, fruits, vegetables, etc., which have a large difference in pulverizing efficiency depending on the variation in viscosity (in a degree with which the density is thin or thick) of food which is not completely pulverized in the container and liquefied food which has been completely pulverized.

Meanwhile, the discharge unit 200 of the present invention is adapted to pulverizing liquefied material, such as juice, etc., or fibrous material, whereas, for instance, when the mixing machine is used just to mix several materials unlike the above-mentioned purpose of use, the function of the discharge unit 200 may not be required. In the case where the function of the discharge unit 200 is not necessary, as shown in FIG. 12, the housing 210 of the discharge unit 200 that has been threaded over the flange 201 of the container 2 is removed from the flange 201. Thereafter, a separate sealing stopper 500 is coupled to the flange 201. In this case, after a desired pulverizing and mixing operation has been completed, the cover 4 of the container 2 opens to discharge the pulverized and mixed food particles through the open end of the container 2.

As described above, a mixing machine according to the present invention includes an introducing unit provided with an inclined material-supply means so that material can be continuously supplied at a constant supply rate into a container in which food is being pulverized. Furthermore, the mixing machine includes a discharge unit which can control the discharge rate of a product in multi-stages so that pulverized food can be continuously discharged out of the container at an appropriate discharge rate.

In particular, when the mixing machine pulverizes fruits, vegetables, bean curd, beans containing water, etc. to obtain juice, paste or slurry type food, the viscosity of crushed food (the degree to which the density of the crushed food is thick) can be maintained constant so that the optimum pulverizing efficiency pertaining to the rotation of a pulverizing blade can be realized. Thus, evenly pulverized food can be rapidly produced.

Furthermore, even though a user puts additional material into a hopper while the pulverizing operation is being conducted, a rate at which material is supplied into the container can be maintained constant. Therefore, the present invention does not force a user to pay close attention to the amount of material input into the introducing unit. In addition, a flow passage of the discharge unit can be controlled in multi-stages in such a simple way as to manipulate a lever, thus being convenient for the user.

Moreover, the mixing machine of the present invention includes a vibration activation means which is provided in the introducing unit. Therefore, material can be smoothly and reliably input from the hopper into the container without using a separate vibration drive unit or vibrating the hopper in a manual manner.

Further, the inclined material-supply means provided in a pipe of the introducing unit isolates the hopper from the container, so that food which is being pulverized in the container is prevented from springing upwards out of the introducing unit. In addition, the mixing machine may further include an extension pipe which is connected to the discharge unit, so that a position at which pulverized food is discharged from the discharge unit can be controlled.

Therefore, the mixing machine and the surroundings thereof can be always maintained clean and sanitary.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mixing machine, comprising:
   a main body having a motor therein;
   a container having a pulverizing blade therein;
   a cover for covering the container, with an inlet hole formed through the cover;
   an introducing unit coupled to the inlet hole of the cover;
   inclined material-supply means provided in the introducing unit so that material is supplied into the container via the inclined material-supply means, the inclined material-supply means for preventing material pulverized in the container from back flowing upwards; and
   a discharge unit coupled to the container, the discharge unit controlling in multi-stages a rate at which a pulverized product is discharged from the container,
   whereby a rate at which material is supplied into the container and the rate at which the pulverized product is discharged from the container are maintained constant so that an efficiency with which the material is pulverized is increased.

2. The mixing machine as set forth in claim 1, wherein the introducing unit comprises:
   a pipe inserted into the inlet hole of the cover, the pipe being located inside the container; and
   a hopper located outside the cover so that the material is put into the hopper.

3. The mixing machine as set forth in claim 2, wherein the inclined material-supply means comprises:
   a plurality of inclined plates provided on an inner surface of the pipe at different heights, the inclined plates forming a symmetric structure along a center line of the pipe, wherein when viewed in a longitudinal direction of the pipe, a surface area of each of the inclined plates is greater than an area of at least a half of a circle defined by the pipe, so that the material falls from the hopper into the container in a zigzag form.

4. The mixing machine as set forth in claim 2, wherein the inclined material-supply means comprises:
   a spiral inclined plate having a size appropriate to prevent an interior of the container from being exposed to an outside when viewed in a longitudinal direction of the pipe.

5. The mixing machine as set forth in claim 2, wherein the inclined material-supply means comprises:
   a rotating shaft coupled to an inner surface of the pipe in a direction traversing a central axis of the pipe; and
   a rotating plate having a diameter corresponding to an inner diameter of the pipe, wherein the rotating plate is tilted to one of opposite sides around the rotating shaft by a weight of the material placed onto the rotating plate so that the material is supplied from the hopper into the container.

6. The mixing machine as set forth in claim 1, wherein the introducing unit further comprises vibration activation means for activating vibrations transmitted from the motor to the introducing unit while pulverizing the material.

7. The mixing machine as set forth in claim 6, wherein the vibration activation means comprises:
   an annular stop protrusion provided around an outer surface of the introducing unit, the annular stop protrusion being coupled to a circumferential edge of the inlet hole of the cover; and
   a plurality of balls located in the annular stop protrusion, the balls being supported on an upper surface of the circumferential edge of the inlet hole.

8. The mixing machine as set forth in claim 1, wherein the inclined material-supply means comprises:
   a plurality of inclined plates provided on an inner surface of the pipe at different heights, the inclined plates forming a symmetric structure along a center line of the pipe, wherein when viewed in a longitudinal direction of the pipe, a surface area of each of the inclined plates is greater than an area of at least a half of a circle defined by the pipe, so that the material falls from the hopper into the container in a zigzag form.

9. The mixing machine as set forth in claim 1, wherein the inclined material-supply means comprises:
   a spiral inclined plate having a size appropriate to prevent an interior of the container from being exposed to an outside when viewed in a longitudinal direction of the pipe.

10. The mixing machine as set forth in claim 1, wherein the inclined material-supply means comprises:
    a rotating shaft coupled to an inner surface of the pipe in a direction traversing a central axis of the pipe; and
    a rotating plate having a diameter corresponding to an inner diameter of the pipe,
    wherein the rotating plate is tilted to one of opposite sides around the rotating shaft by a weight of the material placed onto the rotating plate so that the material is supplied from the hopper into the container.

11. The mixing machine as set forth in claim 1, wherein the discharge unit comprises:
    a flange provided on a lower portion of a sidewall of the container, the flange forming an outlet port;
    a housing having a coupling part on one end thereof, the coupling part being coupled to the flange, with a discharge port formed in a lower portion of the housing;
    an operating shaft provided in the housing, with a lever coupled to a first end of the operating shaft, and a stopper provided on a second end of the operating shaft, wherein depending on operation of the lever, the stopper is brought into close contact with the outlet port to close a flow passage or is moved away from the outlet port to open the flow passage;
    an elastic member biasing the operating shaft from the housing towards the outlet port; and
    flow rate control means for locking a position of the operating shaft in multi-stages so as to control a distance between the stopper and the outlet port.

12. The mixing machine as set forth in claim 11, wherein the flow rate control means comprises:
    a plurality of seating protrusions provided on a circumferential outer surface of the operating shaft at positions spaced apart from each other at regular intervals; and
    a seating depression formed in a circumferential inner surface of the housing so that a selected one of the seating protrusions is seated into the seating depression.

13. The mixing machine as set forth in claim 11, wherein the discharge unit further comprises:
    an extension pipe coupled to the discharge port formed in the lower portion of the housing so that the product is discharged from the discharge unit at a position spaced apart from the mixing machine by a predetermined distance.

14. The mixing machine as set forth in claim 13, wherein the extension pipe comprises:
    a first extension pipe connected to the discharge port of the housing, the first extension pipe extending a predetermined length and being bent at a predetermined position thereof; and
    a second extension pipe connected to an end of the first extension pipe by length adjustment means provided on a junction therebetween.

* * * * *